US011499942B2

(12) United States Patent
Li

(10) Patent No.: US 11,499,942 B2
(45) Date of Patent: Nov. 15, 2022

(54) METHODS AND APPARATUS FOR INTERFACING SENSORS WITH FLUID MATERIALS

(71) Applicant: AVIANA MOLECULAR TECHNOLOGIES, LLC, Orlando, FL (US)

(72) Inventor: Mo-Huang Li, Wesley Chapel, FL (US)

(73) Assignee: Aviana Molecular Technologies, LLC, Wynnewood, PA (US)

( * ) Notice: Subject to any disclaimer, the term of this patent is extended or adjusted under 35 U.S.C. 154(b) by 0 days.

(21) Appl. No.: 16/629,305

(22) PCT Filed: Jul. 5, 2018

(86) PCT No.: PCT/US2018/040875
§ 371 (c)(1),
(2) Date: Jan. 7, 2020

(87) PCT Pub. No.: WO2019/010275
PCT Pub. Date: Jan. 10, 2019

(65) Prior Publication Data
US 2020/0284762 A1    Sep. 10, 2020

Related U.S. Application Data

(60) Provisional application No. 62/529,945, filed on Jul. 7, 2017.

(51) Int. Cl.
*G01N 29/02* (2006.01)
*G01N 29/036* (2006.01)
*G01N 29/22* (2006.01)

(52) U.S. Cl.
CPC ......... *G01N 29/022* (2013.01); *G01N 29/036* (2013.01); *G01N 29/222* (2013.01);
(Continued)

(58) Field of Classification Search
CPC .. G01N 29/022; G01N 29/036; G01N 29/222; G01N 29/32; G01N 2291/011;
(Continued)

(56) References Cited

U.S. PATENT DOCUMENTS 10,037,382 B2    7/2018 Tanaka et al.
2009/0277271 A1    11/2009 Seppa et al.
(Continued)

FOREIGN PATENT DOCUMENTS

WO    2019010275 A1    1/2019

OTHER PUBLICATIONS

Extended European Search Report dated Feb. 12, 2021 for related European Application No. 18828917.7.
(Continued)

*Primary Examiner* — Tarun Sinha
(74) *Attorney, Agent, or Firm* — Burns & Levinson LLP; Joseph P. Quinn

(57) ABSTRACT

Various liquid cells for use in surface acoustic wave-based sensors are disclosed. The sensor can include a substrate, at least one sensor element, and at least one pair of electrical components. The electrical components can be located on opposite ends of the sensor element. The liquid cell can include a top layer that is configured to cover at least a portion of the pair of electrical components. The liquid cell can also include a fluidic channel. The fluidic channel can be configured to receive a liquid media and is arranged not intersect with any of the pair of electrical components. The liquid cell can also include a plurality of peripheral walls that are configured to form a plurality of air pockets. Each of the plurality of air pockets are configured to form virtual non-physical walls to prevent the liquid media from contacting the at least one sensor element.

12 Claims, 12 Drawing Sheets

(52) U.S. Cl.
CPC .. *G01N 2291/011* (2013.01); *G01N 2291/015* (2013.01); *G01N 2291/0255* (2013.01); *G01N 2291/0256* (2013.01)

(58) Field of Classification Search
CPC ..... G01N 2291/015; G01N 2291/0255; G01N 2291/0256
USPC ........................................................ 73/24.06
See application file for complete search history.

(56) References Cited

U.S. PATENT DOCUMENTS

| | | | |
|---|---|---|---|
| 2009/0282902 A1 | 11/2009 | Warthoe | |
| 2010/0319439 A1* | 12/2010 | Lee | G01N 29/022 73/64.53 |
| 2011/0101822 A1* | 5/2011 | Olariu | G01K 11/265 310/313 B |
| 2015/0263698 A1 | 9/2015 | Tanaka et al. | |
| 2016/0025580 A1 | 1/2016 | Ooya et al. | |
| 2017/0149408 A1* | 5/2017 | Belsick | H03H 9/175 |

OTHER PUBLICATIONS

Xu Zhang et al, "Thermal Analysis and Characterization of a High Q Film Bulk Acoustic Resonator (FBAR) as Biosensors in Liquids", Micro Electro Mechanical Systems, 2009. MEMS 2009, pp. 939-942, Jan. 25, 2009.
International Preliminary Report on Patentability dated Jan. 16, 2020 for related Application No. PCT/US18/40875.
International Search Report and Written Opinion dated Sep. 27, 2018 for related Application No. PCT/US18/40875.

\* cited by examiner

METHODS AND APPARATUS FOR INTERFACING SENSORS WITH FLUID MATERIALS

CROSS REFERENCE TO RELATED APPLICATIONS

This patent application is a national stage application, filed under 35 U.S.C. § 371, of International Application No. PCT/US18/40875, filed Jul. 5, 2018, which claims the benefit of priority of U.S. Provisional Application No. 62/529,945, filed Jul. 7, 2017, of which is hereby incorporated by reference in its entirety.

FIELD

This disclosure relates to structures and methods for developing a fluidic system. More particularly, this disclosure relates to fluidic systems having sensors for biochemical/biomedical or diagnostic analysis in liquid media that limit and/or prevent electrical leakages.

BACKGROUND

Surface Acoustic Wave ("SAW") based sensors can be used to measure various types of biochemical analysis in liquid media. The SAW sensor can include a piezoelectric substrate, an input interdigitated transducer ("IDT"), and an output interdigitated transducer. When using SAW sensors for biochemical or biomedical analysis, liquids are introduced to the sensor elements. Unfortunately, liquid contact with electrical components (e.g., an IDT) of a SAW sensor may have undesirable effects on the sensor and/or the sensor reading. Accordingly, there is an urgent need to develop fluidic systems that prevent unwanted interactions between the corresponding areas (e.g. the electrical elements and the liquid media), for example, to prevent electrical leakages while limiting any loss and/or distortion of the sensor response.

SUMMARY

In one aspect, the disclosure provides a sensor that includes a substrate; at least one sensor unit, wherein the at least one sensor unit includes a sensor element; a pair of electrical components located on opposite ends of the at least one sensor element; and at least one peripheral wall disposed on the substrate and configured to surround the pair of electrical components and at least a portion of the sensor element; and a top layer disposed over the at least one peripheral wall, thereby creating an air pocket over each of the electrical components.

In an embodiment, the sensor may be a SAW sensor or a BAW sensor.

In an embodiment, the sensor may further include a fluidic channel over a portion of the sensor element, wherein the fluidic channel is configured to receive a liquid medium.

In an embodiment, the substrate may be a piezoelectric material.

In an embodiment, the sensor element may include a modified substrate surface configured to capture at least one analyte.

In an embodiment, the pair of electrical components may include an interdigital transducer.

In an embodiment, one of the pair of electrical components may include a reflector.

In an embodiment, one of the at least one pair of electrical components may include at least one interdigital transducer.

In an embodiment, the sensor element and the pair of electrical components may be aligned along an axis.

In an embodiment, the liquid media may the configured to enter the fluidic channel through an inlet on a first end of the fluidic channel and to exit the fluidic channel through an outlet on a second end of the fluidic channel.

In an embodiment, the at least one peripheral wall is formed from any one of a plastic sheet, double-sided tape, injection molding material, and gasket.

In an embodiment, an air pocket over the electrical component may have a thickness of about 0.1 µm to about 1 mm.

In an aspect, the disclosure provides a method of isolating an electrical component from a fluid media on a sensor that includes the steps of: providing at least one peripheral wall on a substrate, wherein the at least one peripheral wall encloses the electrical components; and providing a top layer on top of the peripheral wall to create an air pocket over the electrical component.

In an embodiment, a virtual wall is formed at the interface of the liquid media and the air pocket, and is defined by a pressure difference between the liquid media and the air pocket.

In an embodiment, the virtual wall may be configured to be created and maintained when the pressure difference is greater than zero.

Disclosed is a liquid cell which interfaces sensor elements with introduced liquid media for biochemical analysis. The liquid cell can be configured to isolate the acoustic wave path and the sensor elements using air pockets. In some embodiments, the air pockets are created without using physical walls. In some embodiments, the non-physical walls are air-liquid virtual walls.

In some embodiments, disclosed is a sensor that comprises a substrate, at least one sensor unit, and a top layer. In some embodiments, each of the sensor unit comprises: a sensor element, a pair of electrical components located on opposite ends of the one sensor element, and at least one peripheral wall disposed on the substrate and configured to surround the pair of electrical components and at least a portion of the sensor element. In some embodiments, the top layer is disposed over the at least one peripheral wall, thereby creating an air pocket over each of the electrical components.

In other embodiments, the sensor is a Sound Acoustic Wave (SAW) sensor. In other embodiments, the sensor is a Bulk Acoustic Wave (BAW) sensor. In other embodiments, the sensor further comprises a fluidic channel over a portion of the sensor element, wherein the fluidic channel is configured to receive a liquid medium. In other embodiments, the substrate comprises a piezoelectric material. In other embodiments, the sensor element comprises a modified substrate surface configured to capture at least one analyte. In other embodiments, one of the pair of electrical components comprises an interdigital transducer. In other embodiments, one of the pair of electrical components comprises a reflector. In other embodiments, one of the at least one pair of electrical components comprise at least one interdigital transducer. In other embodiments, the sensor element and the pair of electrical components are aligned along an axis. In other embodiments, the liquid media is configured to enter the fluidic channel through an inlet on a first end of the fluidic channel and to exit the fluidic channel through an outlet on a second end of the fluidic channel. In other embodiments, the at least one peripheral wall is formed from any one of a plastic sheet, double-sided tape, injection molding material, and gasket. In other embodiments, the air pocket over the electrical component has a thickness of about 0.1 µm to about 1 mm.

In some embodiments, disclosed is a method of isolating an electrical component from a fluid media on a sensor. In some embodiments, the method comprises the step of providing at least one peripheral wall on a substrate, wherein the at least one peripheral wall encloses the electrical components. In some embodiments, the method comprises the step of providing a top layer on top of the peripheral wall to create an air pocket over the electrical component.

In other embodiments, the method comprises a virtual wall formed at the interface of the liquid media and the air pocket, and is defined by a pressure difference between the liquid media and the air pocket. In other embodiments, the virtual wall is configured to be created and maintained when the pressure difference is greater than zero.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

BRIEF DESCRIPTION OF THE DRAWINGS

Various embodiments are depicted in the accompanying drawings for illustrative purposes, and should not be interpreted as limiting the scope of the embodiments. Furthermore, various features of different disclosed embodiments can be combined to form additional embodiments, which are part of this disclosure.

FIG. 5A) or a gasket (e.g. FIG. 5B).

DETAILED DESCRIPTION

The present disclosure is based, at least in part, on the discovery that one or more virtual walls (e.g., air-liquid virtual walls) may be incorporated into a liquid cell(s) and configured to allow a liquid (e.g., a chemical sample, a biological sample, and the like) to interface with a Sound Acoustic Wave ("SAW") sensor electrical element or interdigitated transducer ("IDT") or reflector without significantly altering/disrupting the SAW sensor response. For example, the liquid cell may isolate liquid from the electrical elements (e.g. IDTs and/or reflectors) with air pockets on the acoustic wave path. In contrast to prior art sensors, there is no physical wall on the acoustic wave path.

Various liquid cell assemblies and manufacturing methods are disclosed to illustrate various examples that may be employed to achieve one or more desired improvements. For purposes of presentation, certain embodiments are disclosed with respect to biochemical analysis, particularly using liquid media. However, the techniques herein can be used in other contexts as well. Indeed, the described embodiments are examples only and are not intended to restrict the general disclosure presented and the various aspects and features of this disclosure. The general principles described herein may be applied to embodiments and applications other than those discussed herein without departing from the spirit and scope of the disclosure. This disclosure should be accorded the widest scope consistent with the principles and features that are disclosed or suggested herein.

Overview

Surface acoustic wave ("SAW") based sensors can be used to perform various types of biochemical sensing and analysis in liquid media. For example, various SAW devices have been developed which include shear horizontal SAW sensors ("SH-SAW"), guided SH-SAW sensors (also called Love-wave devices), and SAW sensors without waveguide.

Figure 1A:
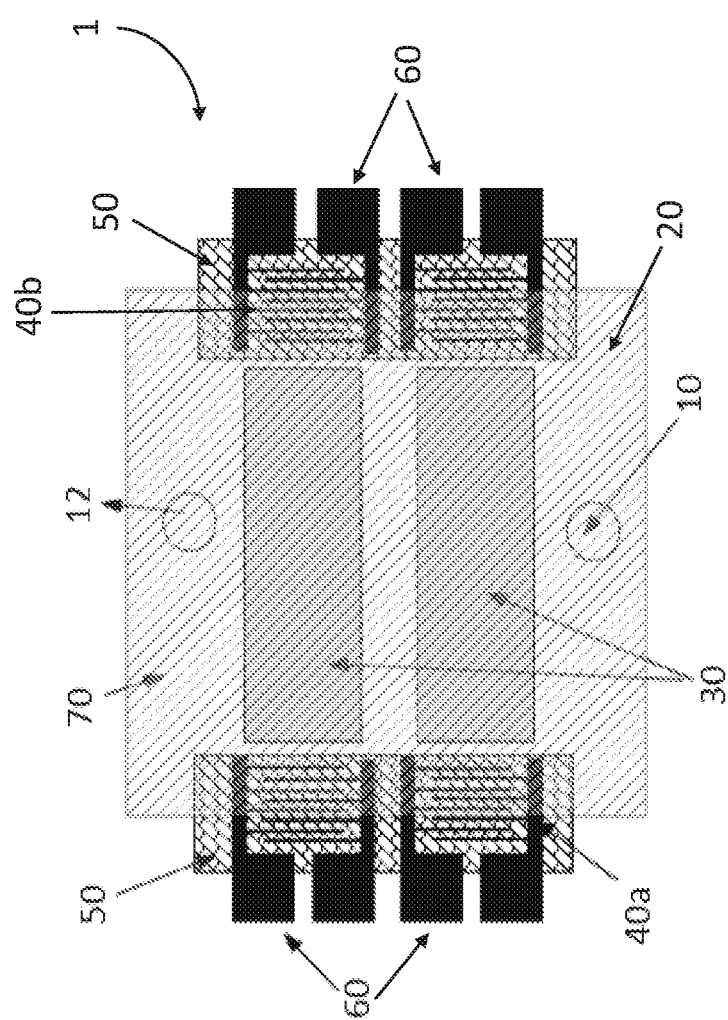
FIG. 1A illustrates a top view of a prior art sensor wherein the sensor elements and electrical components are covered with an insulator (e.g. noncorrosive silicone rubber, silicone dioxide layer, air cavity) to prevent unwanted interactions between fluids and the electrical components.
Figure 1B:
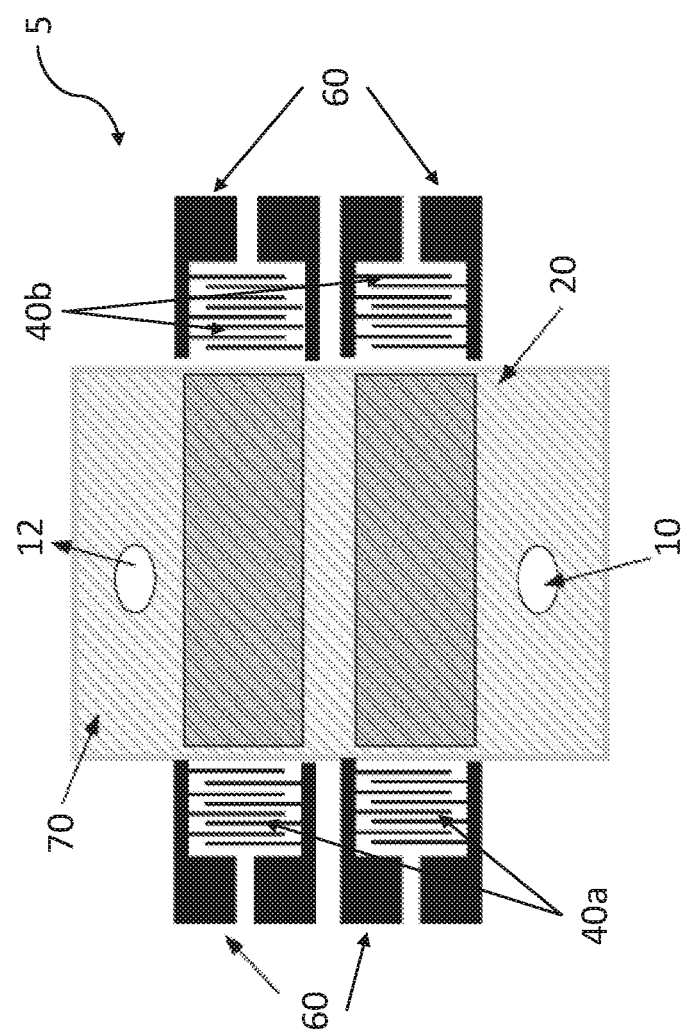
FIG. 1B illustrates a top view of another prior art sensor wherein the sensor elements and electrical components are separated by sealing the liquid cell about the sensor elements to prevent unwanted interactions between fluids and the electrical components.

FIGS. 1A and 1B illustrate prior art sensor 1 and prior art sensor 5 respectively. Prior art sensors can include a piezoelectric substrate (not shown), an input interdigitated transducer ("IDT") 40a on one side of the surface of the substrate, an output IDT 40b on the other side of the surface of the substrate, and electrical contacts 60 that provide electric signal to the IDTs. The space between input and output IDTs 40a and 40b, across which the surface acoustic wave will propagate, is known as the delay-line. The sensor elements 30 are located on the surface of the piezoelectric substrate along the delay-line.

The input IDT 40a converts an electrical signal into an acoustic mechanical wave. This acoustic mechanical wave is configured to propagate across the surface of the piezoelectric substrate. When the acoustic wave reaches the output IDT 40b, the acoustic wave is transduced back into an electrical signal. When a physical (e.g. temperature) or chemical (e.g. mass, or viscosity) change occurs at the delay-line, this can affect the acoustic wave propagation. The change in acoustic wave propagation can be measured by detecting the variance of input and output electrical signals in terms of, for example, amplitude, phase, frequency, and/or time-delay.

A challenge that arises when using SAW sensors for biochemical analysis in liquid media is the development of a reliable fluidic system. The IDTs must be properly sealed or isolated from the liquid media in order to prevent any electrical leakages. Several approaches have been developed to isolate the IDTs and the electrical contacts from the fluid. FIG. 1A illustrates an approach in which prior art sensor 1 includes a flow cell 20, sensor elements 30, and electrical contacts 60. Electrical contacts 60 and the input IDT 40a and output IDT 40b of the prior art sensor 1 are covered with an insulator 50. The insulator 50 can be made from a variety of materials such as a noncorrosive silicone rubber, a silicon dioxide layer, or an air cavity. The prior art sensor 1 can include a top layer 70 having an inlet 10 and an outlet 12 to allow the liquid to flow through the sensor 1. When fluid is introduced onto the sensor elements 30, the insulator 50 serves as a physical barrier between the fluid and the electrical contacts 60/IDTs 40a and 40b.

FIG. 1B illustrates another approach to limit the interaction between the liquid media and the electrical elements. In the prior art sensor 5 of FIG. 1B, a flow cell 20 is placed on top of the piezoelectric substrate to create a fluid channel over the sensor elements 30. The flow cell 20 has walls that separate the IDTs and sensor elements, and is usually sealed to the substrate using a rubber seal. The fluid is introduced into the inlet 10 on the top layer 70 of the flow cell 20, and confined in the region between the input IDT 40a and the output IDT 40b. The flow cell 20 allows the liquid to contact the sensor elements 30 without exposure to the IDTs 40a and 40b and the electrical contacts 60. The fluid can then be removed from outlet 12 located on the top layer 70 of the flow cell 20.

In the above-described examples (e.g. prior art sensor 1 and prior art sensor 5), both sensors have physical walls between the IDTs and the sensor elements. Disadvantageously, when the walls are pressed onto the device surface, the acoustic wave could be disturbed or disrupted, resulting in a significant increase in overall loss and distortion of the sensor response. To maximize the capabilities of these SAW-based devices, sensors therefore should be designed with structures to protect the electrical elements from the liquid media while ensuring that the acoustic signal propagated across the sensor element is not perturbed by the acoustic signal.

Disclosed herein are embodiments of liquid cells which allows a liquid to interface with the SAW sensor element without significantly disrupting the sensor response. The liquid cell isolates the acoustic wave path and the electrical elements (e.g. IDTs and/or reflectors) with air pockets. In some embodiments, these air pockets are created by using air-liquid virtual walls. In contrast to prior art sensors, there is no physical wall along the acoustic wave path.

Figure 2A:
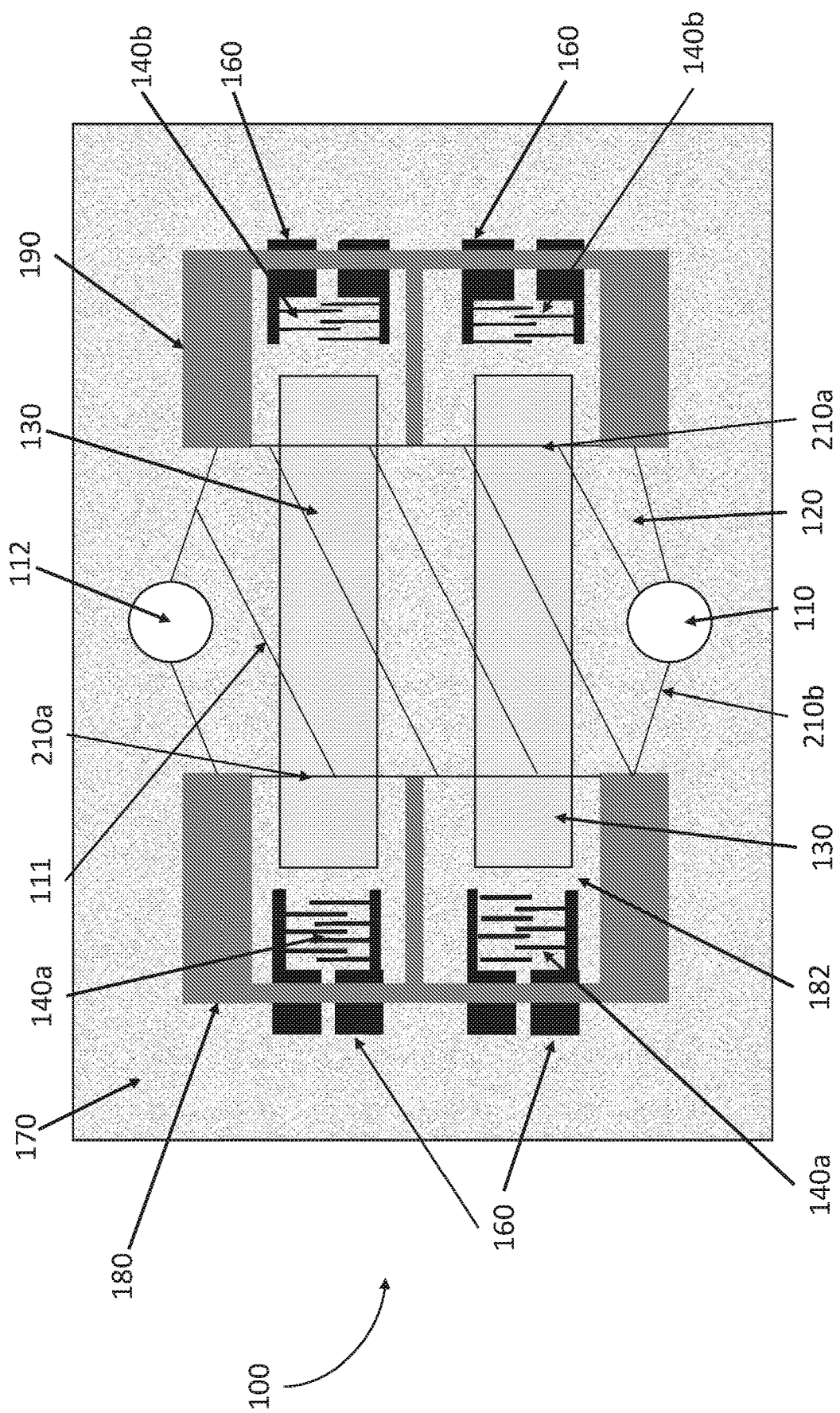
FIG. 2A illustrates a top view of a liquid cell that includes pairs of input and output interdigital transducers according to an exemplary embodiment of the disclosure.
Figure 2B:
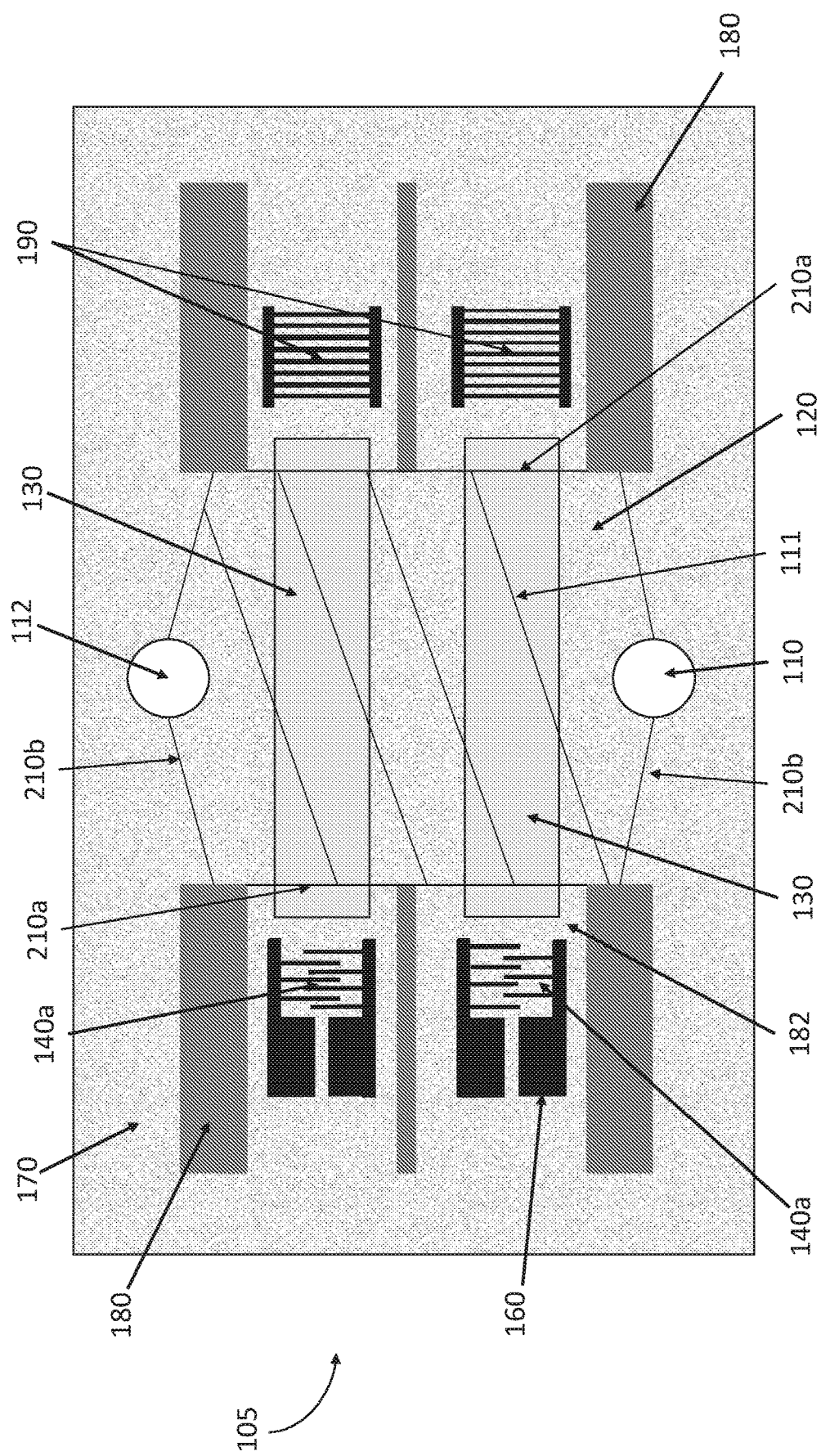
FIG. 2B illustrates a top view of the liquid cell of FIG. 2A that includes pairs of input interdigital transducers and reflectors according to an exemplary embodiment of the disclosure.

FIGS. 2A and 2B illustrate two exemplary embodiments of the SAW sensor with liquid cell 100 interface. As will be discussed in more detail below, the liquid cell 100 can include sealing members 210a and 210b having peripheral walls 180 disposed on the sensor substrate 182. In some examples, the sensor substrate is a piezoelectric or metal wave guide. The peripheral walls 180 of the liquid cell 100 can surround both the acoustic wave path and electrical elements (e.g. IDTs such as 140a and 140b and reflectors 190). A top plate can be configured to sit over the hexagon shaped patterned area with inlet 110 and outlet 112 peripheral walls 210a and 210b and provides at least one opening to allow liquid material to be introduced into or removed from the liquid cell 100. The openings 110 and 112 may be in any shape, and can be located directly over the sensor elements 130 or to the side of the sensor elements 130. In some embodiments, the entire area between the electrical elements (e.g. the IDTs and reflectors) are capped with air when the liquid material is introduced. As will be discussed in more detail below, the configuration of the disclosed liquid cell 100 allows pressure to be generated when the liquid sample is introduced into the liquid cell 100 from the opening to form air-liquid virtual walls which can isolate the electrical elements (e.g. the IDTs and reflectors) from the liquid introduced into the sensing area.

Liquid Cell Overview

FIGS. 2A and 2B illustrate top views of two embodiments of the liquid cell 100. As shown in both embodiments of the liquid cells 100 and 105 in FIGS. 2A and 2B, respectively, the liquid cell 100 and liquid cell 105 can include a device substrate (not shown) that serves as the base of the sensor and support a plurality of elements (e.g. sensor elements, electrical elements, etc.). In some embodiments, the device substrate comprises a piezoelectric material.

A plurality of elements can be provided on the surface of the device substrate. For example, as shown in FIGS. 2A and 2B, respectively, liquid cell 100 and liquid cell 105 can include a plurality of sensor elements 120 and 130 provided on the surface of the substrate 111 (see hatched region in FIG. 2A). The sensor depicted in FIG. 2A comprises input transducers 140a and output transducers 140b on the opposite sides of each sensor elements 130, and electrical contacts 160 coupled to the input transducers 140a and the output transducers 140b.

The sensor depicted in FIG. 2B comprises an input transducer 140a on one side of each sensor element 130 and a reflector 190 on the other side of the sensor elements 130. The transducers are coupled to the electrical contacts 160. The electrical contacts 160 are configured to deliver electrical signals to the input transducers 140a and the output transducers 140b, which are configured to transduce the electric signals to sound waves. Although the liquid cell 100 and the liquid cell 105 are illustrated with two sensor elements 130, the disclosed liquid cells can include any number of sensor elements 130 (e.g. one, two, three, four, five, etc.). In some embodiments, the sensor element 130 can be centered on the surface of the device substrate. In some embodiments, the sensor element 130 can have an off-centered configuration. The sensor elements 130 are provided along the paths of the sound wave propagation.

As discussed above, the sensor element 130 can be configured to propagate a signal from the input transducer 140a to the output transducer 140b. In some embodiments, the sensor element 130 is a surface-acoustic wave-based sensor. The sensor element 130 can have a length of between 1 mm and 20 mm. In some embodiments, the sensor element 130 can have a length of under 1 mm, between 1 mm 2 mm, between 2 mm 3 mm, between 3 mm 4 mm, between 4 mm 5 mm, between 5 mm 6 mm, between 6 mm 7 mm, between 7 mm 8 mm, between 8 mm 9 mm, between 9 mm 10 mm, between 10 mm 11 mm, between 11 mm 12 mm, between 12 mm 13 mm, between 13 mm 14 mm, between 14 mm 15 mm, between 15 mm 16 mm, between 16 mm 17 mm, between 17 mm 18 mm, between 18 mm 19 mm, between 19 mm 20 mm, or above 20 mm. In some examples, the sensor element 130 can have a length of 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, or 20 mm. In some embodiments, the sensor element 130 can be include in a biological or chemical layer. In some examples, the biological or chemical layer can be configured to provide biomaterial and/or chemical detections.

In some embodiments, the sensor element 130 is a Bulk Acoustic Wave ("BAW") sensor. A BAW sensor is a device composed of at least one piezoelectric material sandwiched between two electrodes. The electrodes apply an alternative electric field on the piezoelectric material which creates some stress which can generate a BAW wave. In some examples, the BAW sensor includes layers with high and low acoustic impedance (e.g. a Bragg reflector) and these layers are suspended. A BAW sensor for liquid or gas operates on the basis that anything interacting with the surface of the BAW sensor will change its resonant frequency. By tracking and decoding the resonant frequency (e.g. by measuring frequency or phase), mass loading and the viscosity of the particles attached to the surface of the sensor can be measured. In some examples, the BAW sensor can include a piezoelectric substrate comprising materials such as, for example, ALN, PZT, Quartz, LiNbO3, Langasite, etc. In some embodiments, the BAW sensor can include electrodes comprising materials such as gold, Aluminum, Copper, etc. In some examples, the BAW sensor can include a Brag reflector comprising a high or low acoustic impedance material. In some examples, the BAW sensor can include a layer to interact with analyte. This layer can be a bioactive layer, can include antibodies or antigens, can be gas sensitive, can comprise palladium, etc. In some embodiments, the BAW sensor can include any material that is configured to propagate an acoustic wave.

Turning next to the plurality of input transducers 140a and output transducers 140b, in some examples, the pair of input transducers 140a and output transducers 140b are aligned along the same axis as the sensor element 130. In some embodiments, an input transducer 140a is provided on one side of the sensor element 130 while a reflector 190 is provided on the opposite side of the sensor element 130 (see e.g., FIG. 2B). The sound waves travel from the input transducer 140a across the sensor element 130 toward the reflector 190, and are reflected back to the transducer 140a and converted back to electric signal for analysis.

In some embodiments, as illustrated in FIGS. 2A and 2B, at least one of the pair of electrical elements (e.g., input transducer 140a and output transducer 140b) can be placed adjacent to an electrical contact 160. As shown in the exemplary embodiment depicted in FIG. 2A, the pair of electrical elements can be a pair of input 140a and output 140b transducers. As both the electrical elements in FIG. 2A are input 140a and output 140b transducers, both the input 140a and output 140b transducers are placed adjacent to an electrical contact 160. In as the exemplary embodiment shown in FIG. 2B, one of the pair of electrical elements is an input transducer 140a and the other of the pair of electrical elements is a reflector 190. In the example illustrated in FIG. 2B, an electrical contact 160 is placed adjacent to the input transducer 140a to provide the input transducer 140a with electrical power.

As shown in FIGS. 2A and 2B the top layer 170 (e.g., a $Li_2TaO_3$ crystal area/region) includes a break located over the center of the sensor element 130 such that a liquid media can be inserted directly over the sensor elements. In some embodiments, the top layer 170 does not include an inlet or an outlet. In some embodiments, the top layer 170 includes an inlet 110 and an outlet 112 that are configured to allow a liquid media to flow through the fluidic channel 120. As will be discussed in more detail below, an air-liquid virtual wall can be formed when the liquid media is introduced into the fluidic channel 120 which prevents the liquid media from contacting the electrical elements. In some examples, the air-liquid virtual formed can be very thin and can be around or greater than 200 μm. In some embodiments, the flow cell 100 and flow cell 105 can include a top layer 170 that is disposed over the device substrate (not shown), the electrical elements (e.g. the pair of input 140a and output 140b transducers (e.g., as shown in flow cell 100) or the input transducer 140a and reflector 190 (e.g., as shown in flow cell 105)), and at least a portion of the sensor element 130.

The top layer 170 can be composed of a plastic material such as polycarbonate, polyethylene, polyethylene, polyvinyl chloride, polypropylene, polystyrene, polymethyl methacrylate, polytetrafluoroethylene, etc. In some embodiments, the top layer 170 can be composed of material such as glass, quartz, etc. In some embodiments, the top layer 170 can have a thickness between 0.1 mm to 2 cm. In some embodiments, the top layer 170 can have a thickness of less than 0.1 mm, between 0.1 mm and 0.2 mm, between 0.2 mm-0.4 mm, between 0.4 mm-0.6 mm, between 0.6 mm-0.8 mm, between 0.8 mm-1.0 mm, between 1.0 mm-1.2 mm, between 1.2 mm-1.4 mm, between 1.4 mm-1.6 mm, between 1.6 mm-1.8 mm, between 1.8 mm-2.0 mm, or greater than 2.0 mm. In some embodiments, the top layer can be any one of 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, or 2.0 mm. In some embodiments, the top layer 170 can be injection molded.

In some examples, as illustrated in FIGS. 2A and 2B, the flow cell 100 can include a fluidic channel 120 configured to receive the fluid media for analysis. In some embodiments, the fluidic channel 120 is non-parallel to the plurality of electrical elements and sensor elements 130. In other embodiments (not shown), the fluidic channel 120 is formed from an opening in the top layer 170 such that the fluidic channel 120 (e.g. the break in the top layer 170) exposes a portion of the plurality of sensor elements 130 of the 100. In some embodiments, the fluidic channel 120 can have a width of 2 mm or a length of 10 mm. In some examples, the fluidic channel 120 is configured to define the sensing area of the flow cell 100.

In order to introduce a liquid medium into the flow cells 100 and/or 105, the flow cells 100 and/or 105 can include an inlet 110 and an outlet 112. In some embodiments, the inlet 110 and the outlet 112 can be formed in the top layer 170. The inlet 110 and the outlet 112 can be located on opposite ends of a fluidic channel 120 that extends over a portion of the plurality of sensor elements 130.

The liquid cell 100 and liquid cell 105 can include a peripheral wall 180 to form air pockets 182 such that an air-liquid virtual wall is formed between the plurality of electrical elements (e.g. the pair of input 140a and output 140b transducers as arranged in flow cell 100 or the input transducer 140a and reflector 190 as arranged in flow cell 105) and the liquid media such that the liquid media does not contact the electrical elements (e.g. the pair of input 140a and output 140b transducers as arranged in flow cell 100 or the input transducer 140a and reflector 190 as arranged in flow cell 105). A discussion regarding formation of the air-liquid virtual wall is provided in more detail below.

The peripheral wall 180 can have a variety of configurations. For example, as shown in FIGS. 2A and 2B, the liquid cells 100 and/or 105 can include a plurality of parallel peripheral walls 180 that run along the outside of and in between each of the electrical elements 160. The liquid cell 105 can also include a perpendicular peripheral wall 180 that extends across a portion of the electrical elements 160 such that the perpendicular peripheral wall 180 is connected to each of the plurality of parallel peripheral walls 180. In some embodiments the peripheral wall 180 has a thickness between 1 μm and 1 mm. In some embodiments, the thickness of the peripheral wall 180 is less than 1 μm, between 1 μm-50 μm, between 50 μm 100 μm, between 100 μm 150 μm, between 150 μm 200 μm, between 200 μm 250 μm, between 250 μm 300 μm, between 300 μm 350 μm, between 350 μm 400 μm, between 400 μm 450 μm, between 450 μm 500 μm, between 500 μm 550 μm, between 550 μm 600 μm, between 600 μm 650 μm, between 650 μm 700 μm, between 700 μm 750 μm, between 750 μm 800 μm, between 800 μm 850 μm, between 850 μm 900 μm, between 900 μm 950 μm, between 950 μm 1 mm, or greater than 1 mm. In some examples, the thickness of the peripheral wall 180 is 1 μm, 50 μm, 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, 950 μm, or 1 mm. In some embodiments, the thickness of the peripheral wall 180 can be fabricated using photo-patternable material (e.g. photoresists), double-sided tape, 3-D printed material, etc.

Virtual Wall Overview

Figure 3A:
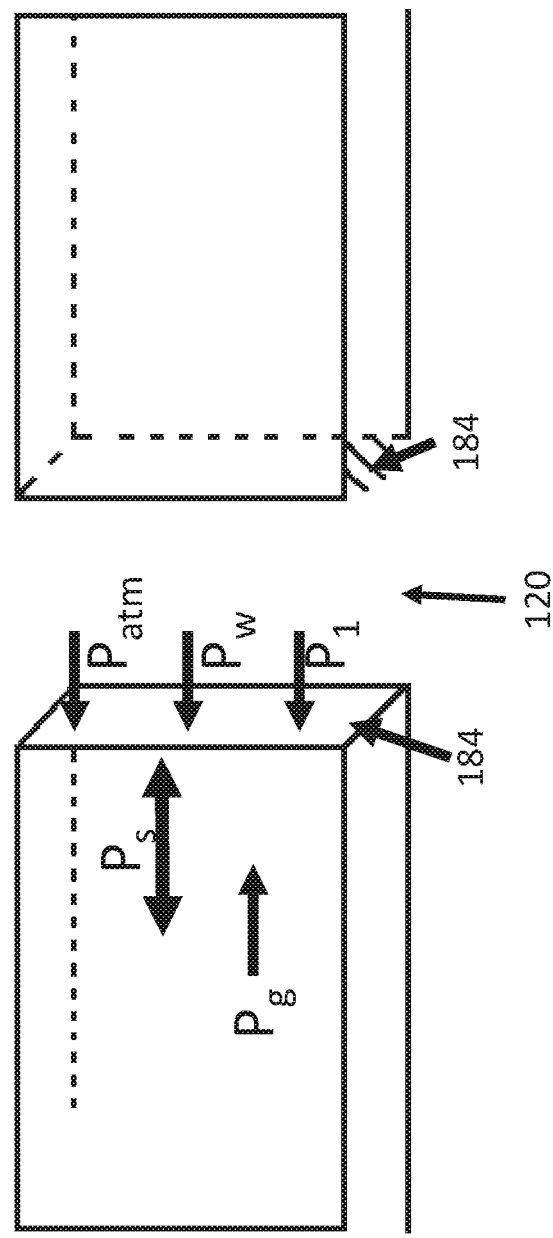
FIGS. 3A and 3B illustrate schematic views of the virtual wall and the pressures applied on the virtual wall, for example, on an exemplary embodiment of the liquid cell illustrated in FIGS. 2A and 2B.
Figure 3B:
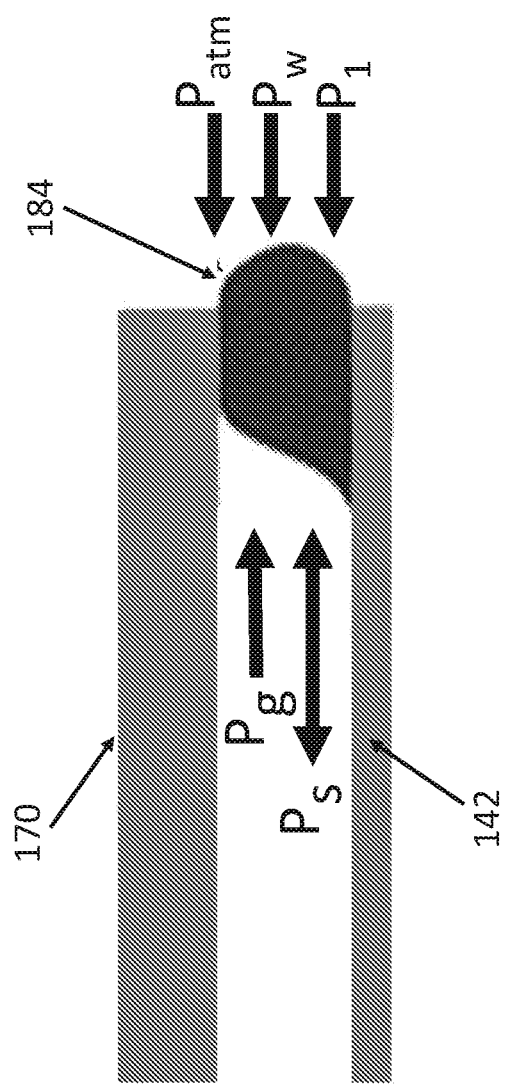

As discussed above, the disclosed liquid cells can include an air-liquid virtual wall to prevent the liquid media from contacting the electrical elements. FIGS. 3A and 3B illustrate the various pressures applied to form the air-liquid virtual wall 184. FIG. 3A shows the fluidic channel 120 between two virtual walls 184 while FIG. 3B illustrates a cross-sectional view of the virtual wall 184 formed between the physical walls of 142 and 170 the various applied pressures.

As shown in FIGS. 3A and 3B, a number of pressures are applied within the liquid cell to form the air-liquid virtual wall 184. The various pressures include, for example:

$P_{atm}$=atmospheric pressure applied from the fluidic inlet, $P_w$=the mass weight of liquid at the channel area, this is very small and generally can be ignored for a liquid in microfluidic channel, $P_f$=the pressure difference between the fluidic channel and the outlet, $P_g$=the air pressure within an air chamber, and $P_s$=surface pressure occurs across the liquid-air interface.

In view of the aforementioned pressures, a virtual wall 184 is determined using the critical pressure ($\Delta P_c$). The critical pressure ($\Delta P_c$) is defined as the pressure difference equation [1] between the air side ($P_g+P_s$) and the liquid side ($P_{atm}+P_w+P_f$) of the virtual wall:

$$t \cdot P_c = (P_g+P_s) - (P_{atm}+P_w+P_f) \qquad \text{Equation [1]}$$

The air pressure ($P_g$) can be calculated using the ideal gas law. When a sealed air chamber (created by the air-liquid virtual wall with original volume of $V_1$) is compressed, the volume of the chamber will decrease and reach an equilibrium ($V_2$). The equilibrium air pressure ($P_g$) inside a sealed chamber can be calculated using the following equation [2]:

$$P_g = P_{atm}(V_1/N_2-1) \qquad \text{Equation [2]}$$

where:

$V_1$=the original volume of air inside the sealed chamber, and $V_2$=the compressed volume of air trapped inside the sealed chamber.

In some embodiments, initially, air at atmospheric pressure ($P_{atm}$) is contained inside a sealed chamber of known volume ($V_1$) which is confined by the virtual wall. When liquid pressure is applied to the virtual wall, some liquid is forced into the sealed chamber, thus compressing the air inside and reaching an equilibrium pressure of $P_g$. In some examples, the equilibrium pressure is zero if the chamber has any opening on the surrounding peripheral wall.

When a liquid is pumped through the virtual wall, a liquid pressure ($P_f$) is applied to the virtual wall which can be approximated using the Hagen-Poiseuille flow equation [3]:

$$P_f = 72 \cdot \mu \cdot Q \cdot L / (AH^2), \text{ for a shallow channel with } w >> H \quad \text{Equation [3]}$$

where:
Q=the volumetric flow rate,
H=depth of the liquid channel,
w=width of the liquid channel,
L=distance between the virtual wall and the outlet,
μ=the liquid viscosity, and
A=the cross-sectional area of the channel.

The liquid pressure can be controlled by adjusting the volumetric flow rate (Q), and dimension of connecting channel.

The surface pressure ($P_s$) occurs across the liquid-air interface can be obtained as Equation [4]:

$$P_s = 2 \cdot \sigma \cdot \sin(\theta - 0.5\pi)/H \quad \text{Equation [4]}$$

where:
σ=the liquid-air surface tension coefficient, and
θ=the static contact angle which may be advancing (θ>90°) or receding (θ<90°), depending on the surface property of material. The surface pressure could be either positive or negative depending on the surface property of material. For a hydrophilic material with a receding contact angle (θ), the surface pressure is negative, whereas for a hydrophobic material (θ>90°), the surface pressure is positive.

Figure 4:
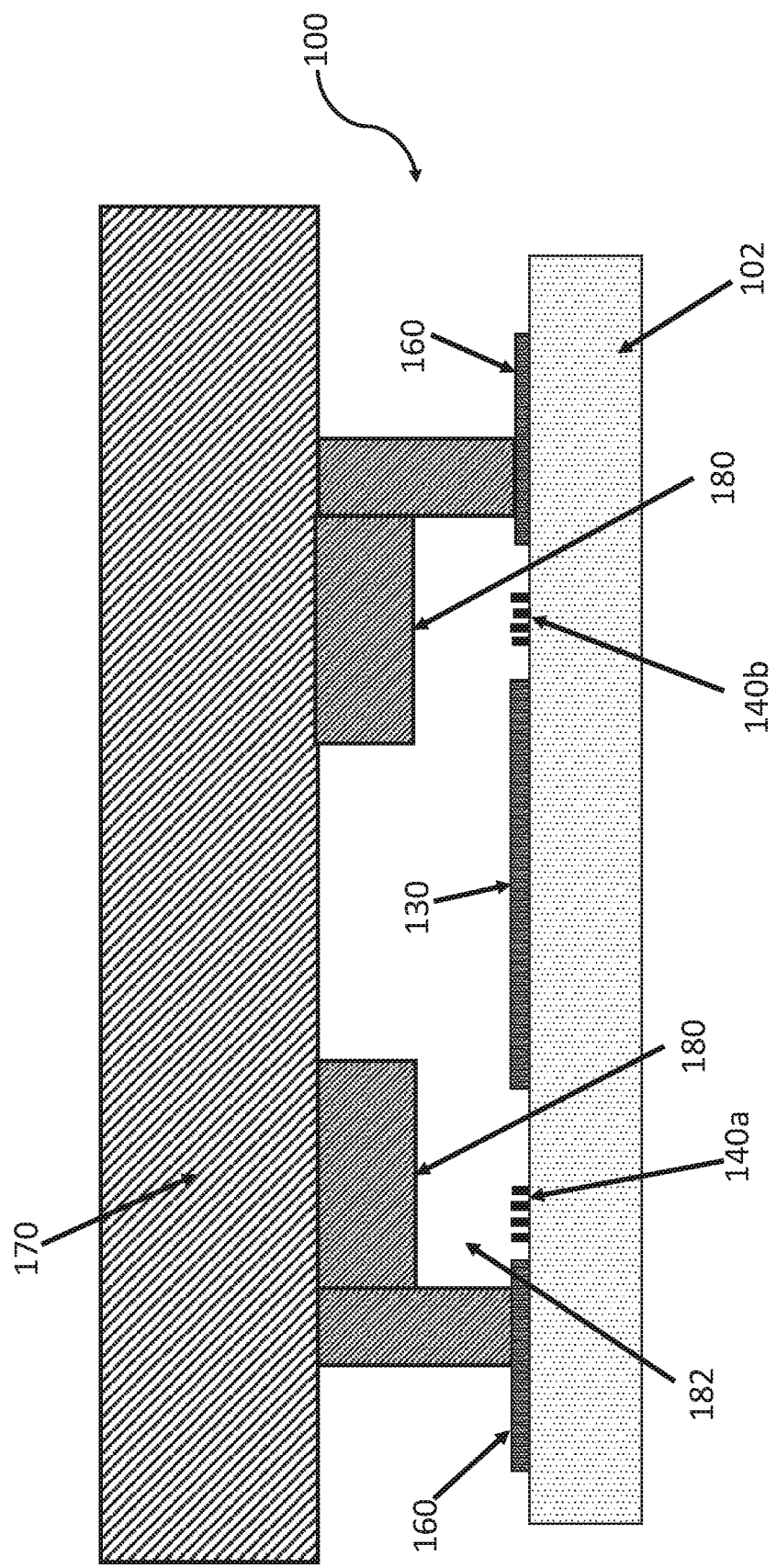
FIG. 4 illustrates a cross-sectional view of a liquid cell showing the positions of the interdigital transducers and/or reflectors and the air pockets according to an exemplary embodiment of the disclosure.

The virtual wall can be created and maintained by keeping the critical pressure $t \cdot P_c$ larger than zero. FIG. 4 illustrates a cross-sectional view of the liquid cell 100 illustrating the positions of the electrical elements (e.g. the input 140a and output 140b transducers and/or the flow cell 105 arrangement of input transducer 140a and reflector 190) and the air pocket 182. As shown, the liquid cell 100 has a bottom device substrate 102 with a sensor element 130 having a pair of electrical elements 160 on either side of the sensor element 130. In some examples, a first side of the sensor element 130 can have an input transducer 140a and an output transducer 140b or a reflector 190 on the second side of the sensor element 130. As discussed above, the peripheral wall 180 can engage a portion of the pair of electrical elements 160 and be disposed over at least a portion of the electrical elements 160 and a portion of either end of the sensor element 130 adjacent to the pair of electrical elements 160. To form the air pockets and the air-liquid virtual wall, a top layer 170 is placed over the device substrate 102, the plurality of sensor elements 130, and the plurality of electrical elements 160. In some embodiments, each of the air pockets 182 are configured to cover at least a portion of a surface of each of the pair of electrical elements 160. The air pockets 182 can be configured to isolate the pair of electrical elements 160 from contacting liquid media in the fluidic channel 120. In some embodiments, the peripheral wall 180 is attached to a surface of the top layer 170.

Virtual Wall Embodiments

The air-liquid virtual wall can be created in a variety of ways. For example, in some embodiments, the air-liquid virtual wall is created by forming a confined chamber. In some embodiments, the top layer can be either a hydrophobic or hydrophilic surface. In some examples, the virtual wall is created by forming an unsealed chamber. In some examples, the top layer can have a hydrophobic surface.

As discussed above, in order to form a virtual wall: $t \cdot P_c = (P_g + P_s) - (P_{atm} + P_w + P_f)$, wherein the virtual wall is created where $t \cdot P_c > 0$. In embodiments where a hydrophilic surface is formed, $P_s$ is negative. In examples where a hydrophobic surface is formed, $P_s$ is positive.

In embodiments similar to that in FIG. 2B (e.g. an unsealed chamber), $P_g$ can be zero. The surface of the liquid cell 100 of FIG. 2B can be hydrophobic or hydrophilic. In some embodiments, the liquid cell 100 of FIG. 2B is preferably hydrophobic.

In embodiments similar to that in FIG. 2A (e.g. a sealed chamber), $P_g$ can be greater than zero. The surface of the liquid cell 100 of FIG. 2A can be hydrophobic or hydrophilic. In some embodiments, the liquid cell 100 of FIG. 2A is preferably hydrophobic.

The air pockets for forming the virtual wall can be created using a variety of methods. In some embodiments, the air pocket can be formed using double sided tape, gasket (e.g., polydimethylsiloxane, silicone), photo-lithography (e.g., SU-8, or photoresist or photo-patternable materials), injection molding (e.g., polycarbonate, PMMA), etc.

In some embodiments the virtual wall is formed between the substrate of the liquid cell and the top layer. In some examples, the gap formed between the top layer and the bottom layer is between 1 μm and 1 mm. In some embodiments, the gap formed is less than 1 μm, between 1 μm 50 μm, between 50 μm 100 μm, between 100 μm 150 μm, between 150 μm 200 μm, between 200 μm 250 μm, between 250 μm 300 μm, between 300 μm 350 μm, between 350 μm 400 μm, between 400 μm 450 μm, between 450 μm 500 μm, between 500 μm 550 μm, between 550 μm 600 μm, between 600 μm 650 μm, between 650 μm 700 μm, between 700 μm 750 μm, between 750 μm 800 μm, between 800 μm 850 μm, between 850 μm 900 μm, between 900 μm 950 μm, between 950 μm 1 mm, or greater than 1 mm. In some examples, the gap formed is 1 μm, 50 μm, 100 μm, 150 μm, 200 μm, 250 μm, 300 μm, 350 μM, 400 μM, 450 μM, 500 μM, 550 μM, 600 μM, 650 μM, 700 μM, 750 μM, 800 μM, 850 μM, 900 μM, 950 μm, or 1 mm.

The liquid cells 200, 300, 400, 500, 600 described below resemble or are identical to the liquid cell 100 in many respects. Accordingly, numerals used to identify components of the liquid cell 100 are incremented by a factor of one hundred to identify like features of the liquid cell 100. This numbering convention generally applies to the remainder of the figures. Any component or step disclosed in any embodiment in this specification can be used in any other embodiments.

Figure 5A:
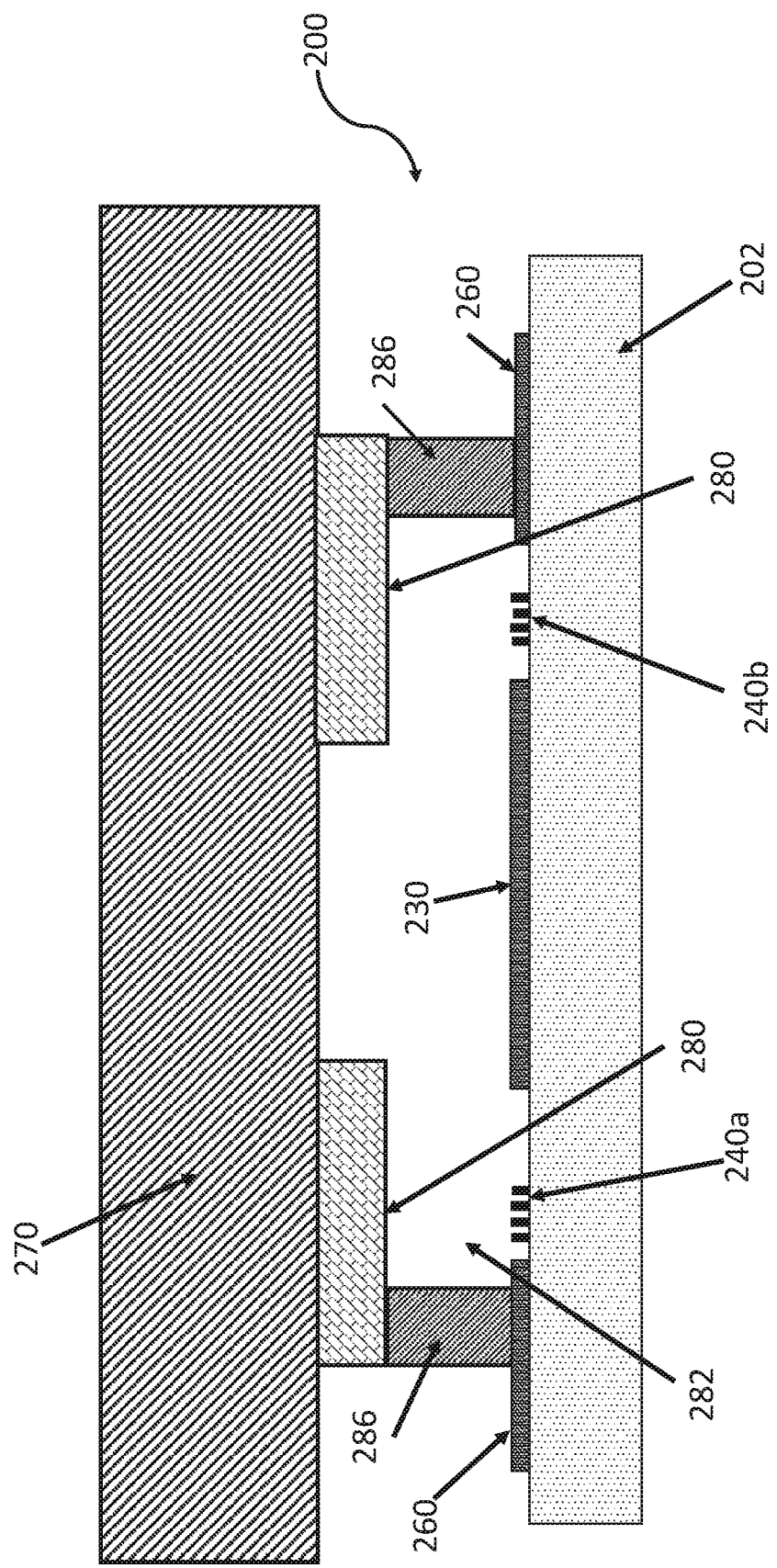
FIGS. 5A and 5B illustrate cross-sectional views of an exemplary embodiment of the liquid cell of FIG. 4 wherein the air pocket can be formed using, for example double-sided tape (e.g.
Figure 5B:
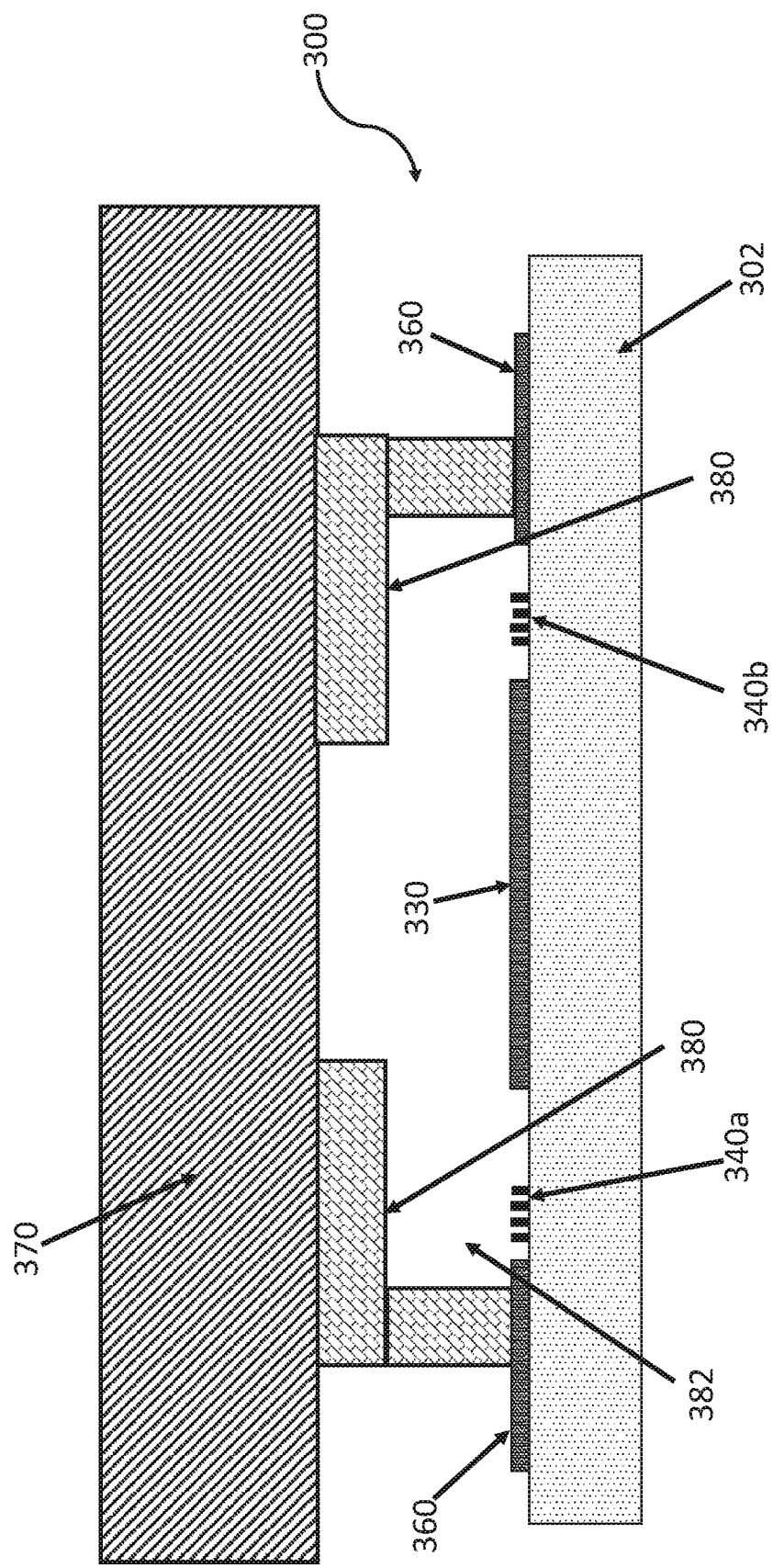

FIGS. 5A and 5B illustrate cross-sectional views of liquid cells having air pockets formed using different methods. Turning first to the flow cell 200 in FIG. 5A, similar to the flow cells 100, 105 described above, the flow cell 200 has a device substrate 202 with a sensor element 230, a plurality of electrical elements (e.g. the input 240a and output 240b transducers or reflectors, not shown) adjacent to a plurality of electrical contacts 260. The air pockets 282 can be formed using tape 286 (e.g. double-sided tape) and a plastic sheet 280. As noted above, the tape 286 is attached on a first side to the plurality of electrical elements 260 and a second side to the plastic sheet 280. As discussed above, the plastic sheet 280 is disposed over a portion of the pair of input 240a and output 240b transducers and a portion of the sensor element 230. In some embodiments, the plastic sheet 280 can be attached to the underside of a top layer 270.

The liquid cell 300 in FIG. 5B, similar to the liquid cells 100, 105, has a device substrate 302 with a sensor element 330, a plurality of electrical elements (e.g. the input 340a and output 340b transducers or reflectors, not shown) adjacent to a plurality of electrical contacts 360. The air pocket 382 can be formed using a gasket 380. In some embodiments, the gasket 380 is attached to a plurality of surface of the electrical contacts 360 and to an underside of a top layer 370. As discussed above, the gasket 380 is disposed over a portion of the input 340a and output 340b transducers and a portion of the sensor element 330.

In some embodiments, a surface treatment can be applied to the liquid cell such that the air pocket is more hydrophobic. In some examples, the surface treatment is applied by coating or chemically grafting a thin layer of hydrophobic material on the substrate material surface. The air pocket can have any shapes, size or dimension. In some embodiments, the air pocket can have a thickness ranging between 0.1 µm to 1 mm.

Figure 6A:
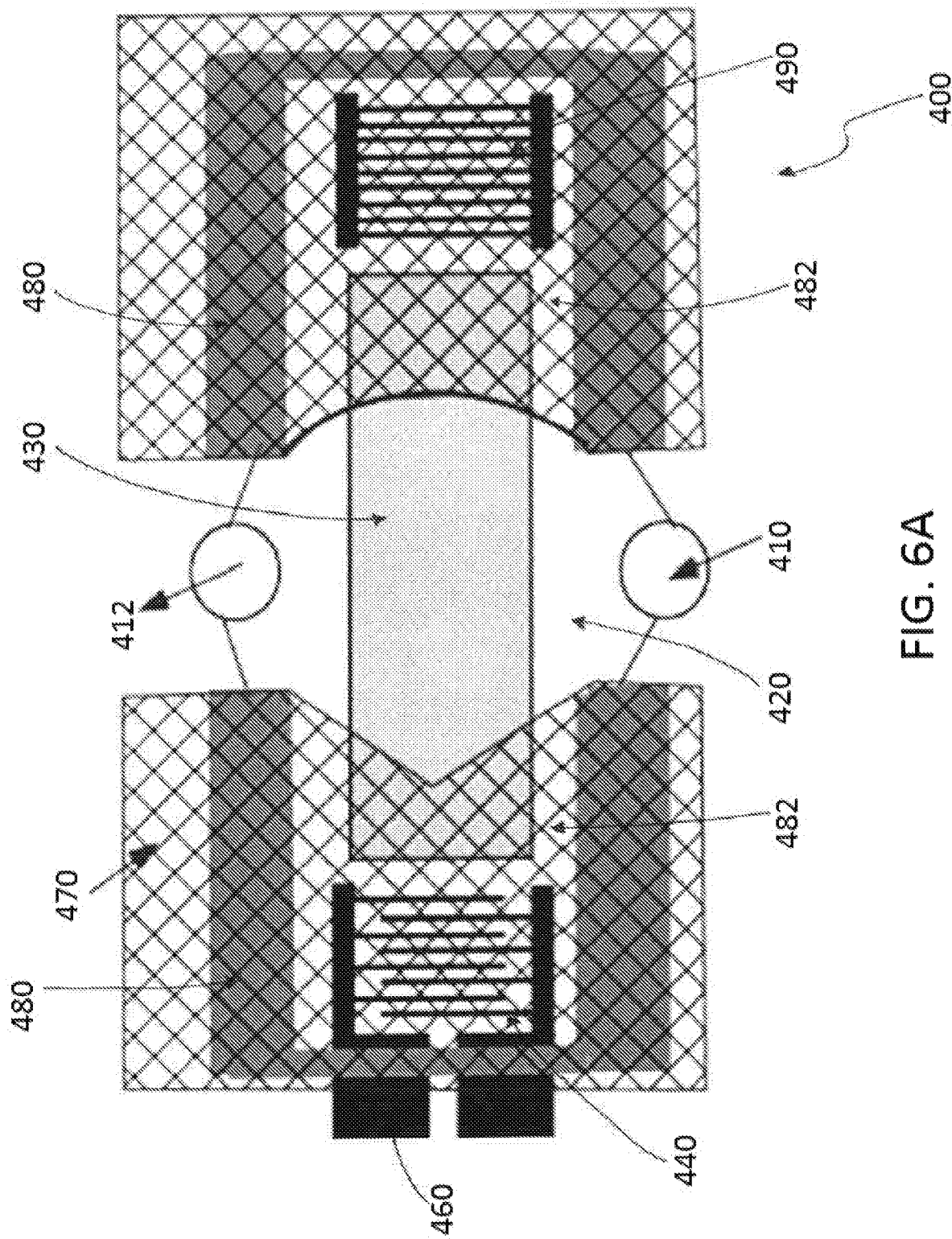
FIGS. 6A and 6B illustrate top views of an exemplary embodiment of a liquid cell according to the disclosure wherein the fluidic channel formed in the liquid cell can be defined by the top layer to have a variety of shapes and/or paths.
Figure 6B:
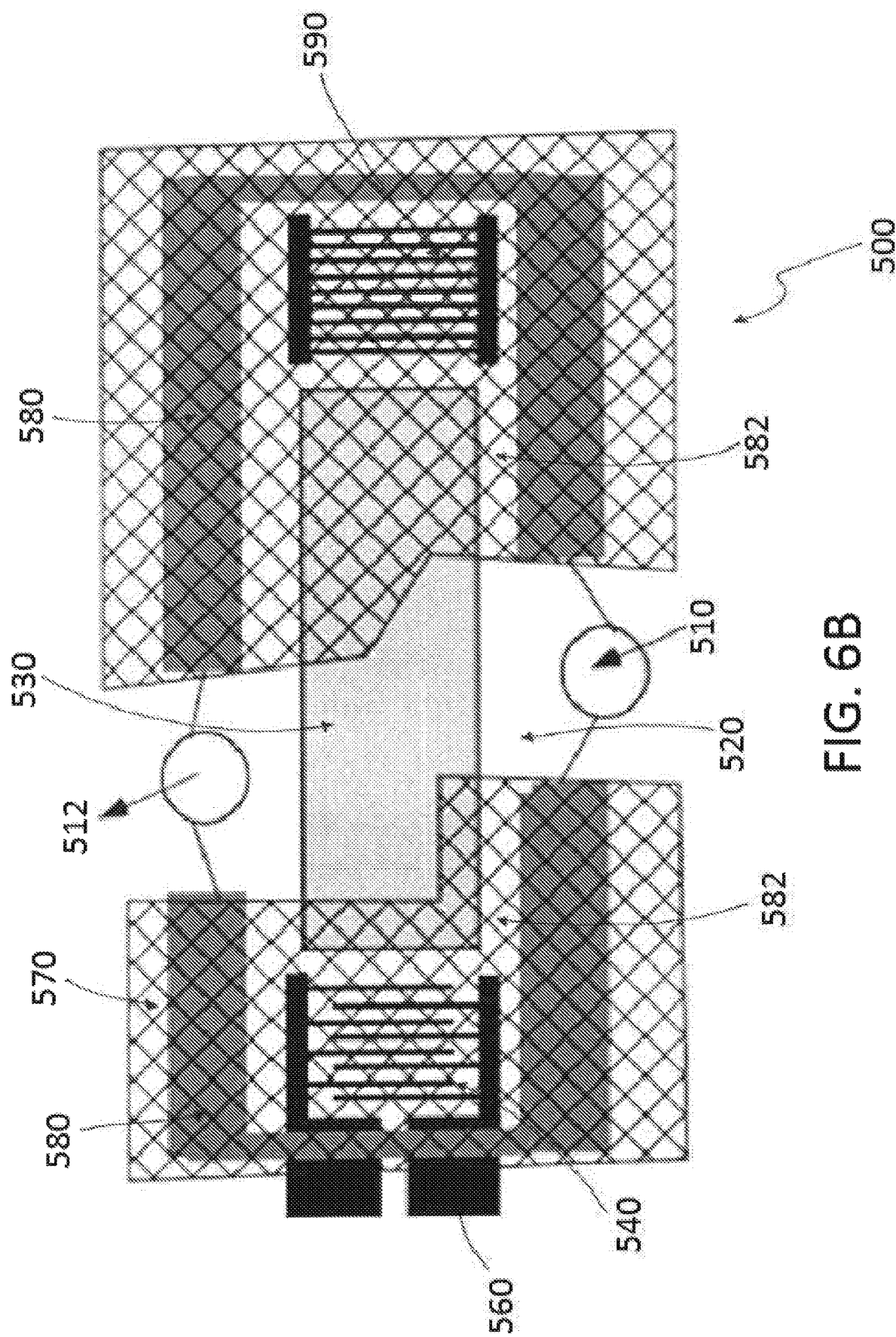

In some embodiments, the structure of the air pocket and/or fluidic channel can be self-defined. In some embodiments, the shape of the fluidic channel can be varied. In some examples, the shape of the fluidic channel 420 can be defined by the structure of the top layer 470. For example, the top layer provides the surface tension force of the air-liquid junction. Examples of the variety of the fluidic channels are shown in FIGS. 6A and 6B. Turning first to FIG. 6A, the liquid cell 400 has a sensor element 430 having a pair of electrical elements on either side of the sensor element 430. For examples, the liquid cell 400 can include an input transducer 440a on a first end and a reflector 490 on a second end. An electrical contact 460 can be located adjacent to the input transducer 440a to supply the input transducer 440a with electrical power. A peripheral wall 480 is configured to form air pockets 482. As discussed above, the top layer 470 is disposed over the electrical elements 460 and the sensor element 430. As shown, a fluidic channel 420 is formed between an inlet 410 and an outlet 412. As seen in FIG. 6A, the fluidic channel 420 has an angled side and a curved side.

The liquid cell 500 of FIG. 6B illustrates another example of the self-defined fluidic channel. The liquid cell 500 has a sensor element 530 having a pair of electrical elements on either side of the sensor element 530. For example, the liquid cell 500 includes an input transducer 540a on a first end and a reflector 590 on a second end. An electrical contact 560 can be located adjacent to the input transducer 540a to supply the transducer 540a with electrical power. A peripheral wall 580 is configured to form air pockets 582. As discussed above, the top layer 570 is disposed over the electrical elements 560 and the sensor element 530. As shown, a fluidic channel 520 is formed between an inlet 510 and an outlet 512. As shown in FIG. 6B, the fluidic channel 520 has two stepped angled sides.

Example

Figure 7:
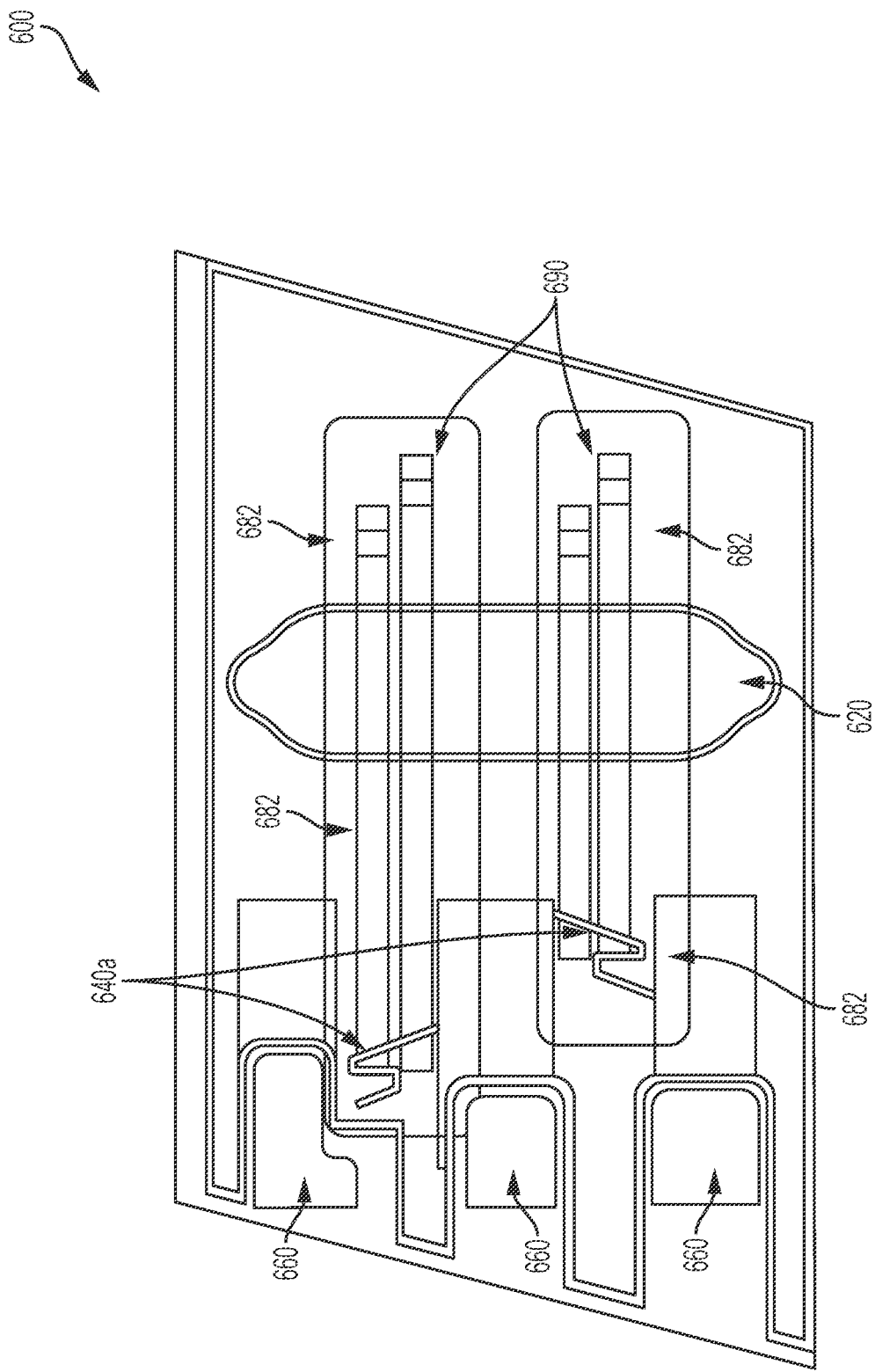
FIG. 7 illustrates a photograph of an exemplary embodiment of a liquid cell according to the disclosure that forms a surface acoustic wave device with air pockets created by double-sided tape.

FIG. 7 illustrates an example of a Surface Acoustic Wave ("SAW") device (e.g. liquid cell 600) having air pockets that are created by double-sided tapes according to the disclosure. The liquid cell 600 of FIG. 7 includes a fluidic channel 620, a plurality of electrical elements (e.g., input transducers 640a and reflectors 690), and a plurality of air pockets 682, as well as a contact pad 660 of the sensor where the reader contacts the sensor.

The SAW device was fabricated using standard photolithographic techniques on a 36° y-cut, x-propagating lithium tantalate (LiTaO3) wafer of 500 µm thick and 100 mm in diameter. The wafer can first be cleaned in a barrel asher, followed by dipping in 1 vol % hydrofluoric acid (HF). A photoresist was then applied onto the wafer, and patterned with photolithographic process, followed by a titanium (10 nm)/Aluminum (70 nm) metallization and liftoff process to create the interdigitated transducer, aluminum waveguide and reflectors. The wafer can then be diced into individual dies.

In the SAW device illustrated in FIG. 7, the air pockets were created using a pressure sensitive double side tape as a space (125 µm in thickness, Adhesive Research, Cat. #90445). The air-pocket areas were cut by laser. The tape is then bonded with a 250 µm thick plastic sheet. The opening area of contact pads and fluidic channel was then laser-cut. Finally, the plastic sheet was bond with the SAW device.

Summary

Although liquid cells have been disclosed in the context of certain embodiments and examples (e.g., biochemical analysis), this disclosure extends beyond the specifically disclosed embodiments to other alternative embodiments and/or uses of the embodiments and certain modifications and equivalents thereof. For example, any of the disclosed covers can be used in dry eyes detection to measure the salt concentration within human tear, in human and animal disease diagnostics to measure the quantity of virus, bacteria, proteins, antibodies, antigens, DNAs, RNAs within biological samples such as blood, urine, nasal swab, vaginal swab, or otherwise. Various features and aspects of the disclosed embodiments can be combined with or substituted for one another in order to form varying modes of the conveyor. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. The figures are drawn and/or shown to scale, but such scale should not be limiting, since dimensions and proportions other than what are shown are contemplated and are within the scope of the disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of leading edge assemblies have been disclosed. Although the assemblies have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described above, but should be determined only by a fair reading of the claims that follow.

What is claimed is:

1. A surface acoustic wave (SAW) sensor comprising:
a substrate;
at least one sensor unit disposed on the substrate, wherein the at least one sensor unit includes:
a sensor element;
a pair of electrical components located on opposite ends of the sensor element; and
a first peripheral wall disposed on the substrate and extending around three sides of a first one of the electrical components and extending around at least a portion of the sensor element proximate the first one of the electrical components;
a second peripheral wall disposed on the substrate and extending around three sides of a second one of the electrical components and extending around at least a portion of the sensor element proximate the second one of the electrical components;
a fluidic channel extending over a portion of the sensor element; and
a top layer disposed over the first peripheral wall and the second peripheral wall, thereby creating an air pocket over each of the electrical components when a fluid is present in the fluid channel, wherein the air pocket is bounded by the top layer, the respective peripheral wall, and the fluid.

2. The SAW sensor of claim 1 wherein the substrate comprises a piezoelectric material.

3. The SAW sensor of claim 1 wherein the sensor element comprises a modified substrate surface configured to capture at least one analyte.

4. The SAW sensor of claim 1, wherein one of the pair of electrical components comprises a reflector.

5. The SAW sensor of claim 1 wherein at least one of the pair of electrical components comprises an interdigital transducer.

6. The SAW sensor of claim 1 wherein the sensor element and the pair of electrical components are aligned along an axis.

7. The SAW sensor of claim 1 comprising an inlet on a first end of the fluidic channel and an outlet on a second end of the fluidic channel.

8. The SAW sensor of claim 1 wherein the at least one peripheral wall is formed from any one of a plastic sheet, double-sided tape, injection molding material, and gasket.

9. The SAW sensor of claim 1, wherein the air pocket over the electrical component has a thickness from about 0.1 µm to about 1 mm.

10. A method of isolating an electrical component of a surface acoustic wave (SAW) sensor from a fluid media on the SAW sensor, the method comprising the steps of:
providing a first peripheral wall on a substrate of the SAW sensor that supports the electrical components, wherein the first peripheral wall extends around three sides of a first one of the electrical components and extends around at least a portion of the SAW sensor proximate the first one of the electrical components;
providing a second peripheral wall disposed on the substrate and extending around three sides of a second one of the electrical components and extending around at least a portion of the SAW sensor proximate the second one of the electrical components;
providing a fluid channel on the substrate; and
providing a top layer on top of the first peripheral wall and the second peripheral wall to create an air pocket over the electrical component when a fluid is present in the fluid channel, wherein the air pocket is bounded by the top layer, the respective peripheral wall, and the fluid.

11. The method of claim 10, comprising forming a virtual wall at the interface of the liquid media and the air pocket, wherein the virtual wall is defined by a pressure difference between the liquid media and the air pocket.

12. The method of claim 10, comprising adjusting a volumetric flow rate of the fluid to control liquid pressure of the liquid media.

* * * * *